Oct. 30, 1928.
E. BARBER ET AL
1,689,712
DIRIGIBLE HEADLIGHT
Filed Jan. 27, 1927
2 Sheets-Sheet 2
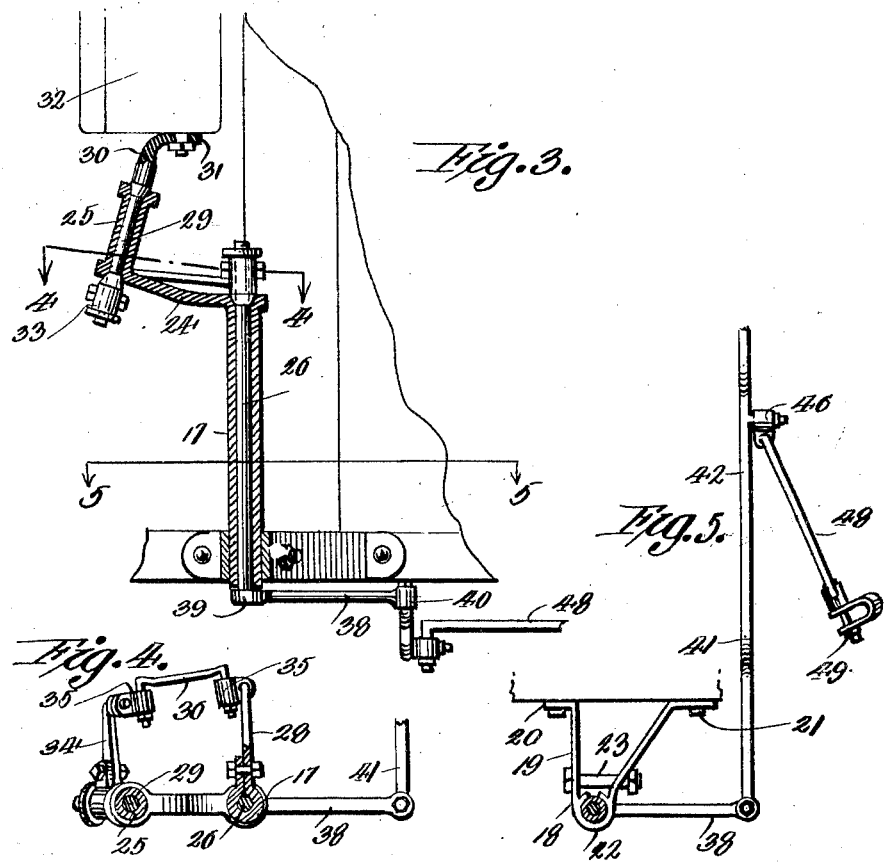
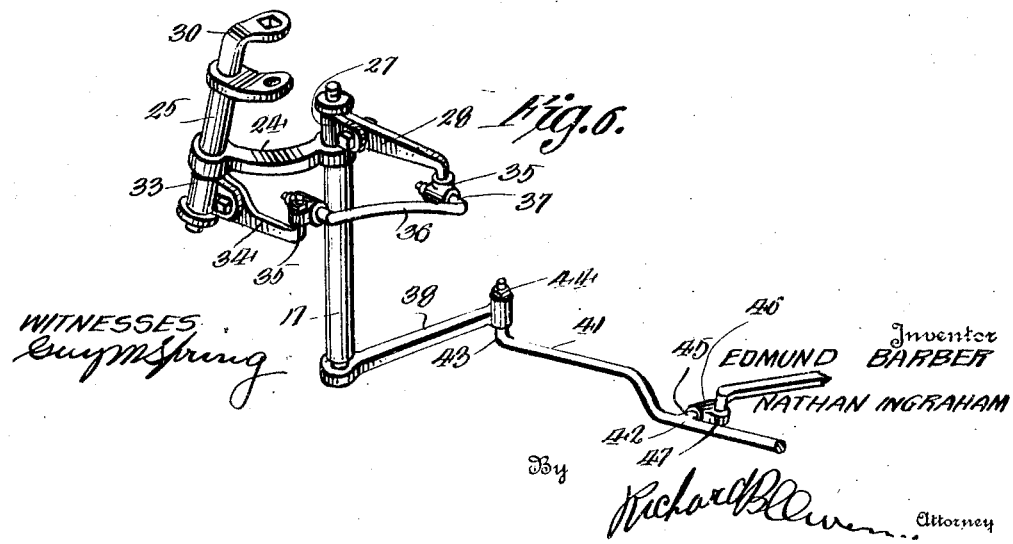
WITNESSES
Inventor
EDMUND BARBER
NATHAN INGRAHAM
By
Attorney Patented Oct. 30, 1928.

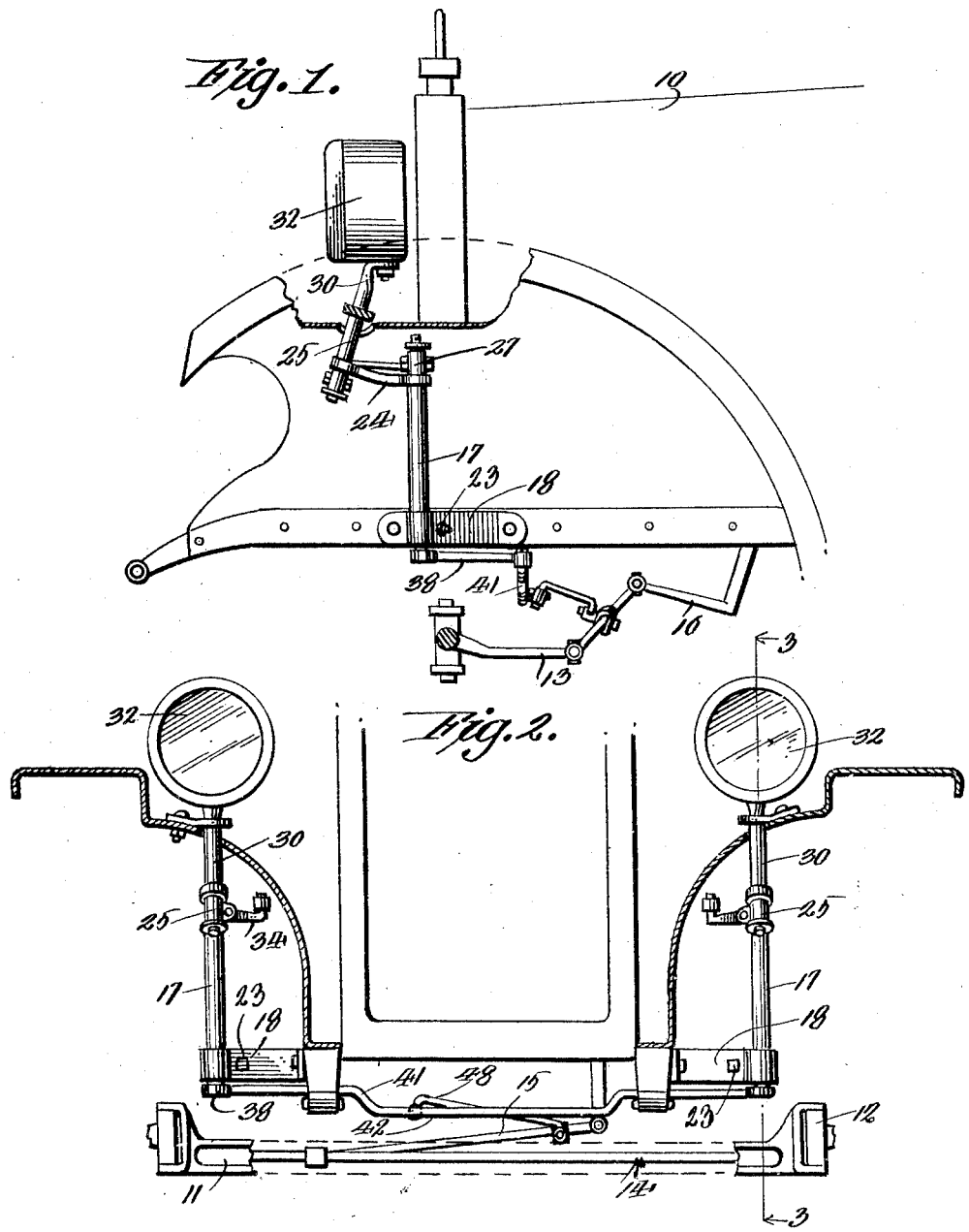

1,689,712

UNITED STATES PATENT OFFICE.

EDMUND BARBER, OF TROY, AND NATHAN INGRAHAM, OF ATHOL, NEW YORK.

DIRIGIBLE HEADLIGHT.

Application filed January 27, 1927. Serial No. 164,063.

The present invention relates to improvements in headlight apparatus for automobiles and similar vehicles and has for its primary object to provide an apparatus of the dirigible type designed to rotate the headlights simultaneously with the steering movement of the front wheels.

A further object of the invention is the provision of a dirigible headlight apparatus which is arranged so that the headlights will be tilted at a forward angle when rotated in angular position to cast the light rays downwardly immediately in front of the steering wheels.

Still another object of the invention is the provision of an apparatus of the above character arranged so that the headlights will be rotated to a greater angular movement than the front steering wheel so as to rotate in advance of the wheels.

Another object of the invention is the provision of an apparatus of the above type which is designed to operate in association with the regular steering equipment of the vehicle and constructed so as to be efficient and reliable in use.

Still another object of the invention is the provision of a dirigible headlight apparatus designed so as to be relatively simple and durable of construction and formed so as to be conveniently installed upon the conventional types of vehicles.

Other objects and advantages of the invention will become apparent as the description progresses.

In the accompanying drawings forming a part of this specification and in which like reference characters are employed to designate corresponding parts throughout the same:

Figure 1 is a fragmentary side elevational view of an automobile illustrating the application of our improved apparatus in association therewith, Figure 2 is a front elevational view of the same, Figure 3 is an enlarged vertical sectional view taken on the line 3—3 of Figure 2, Figure 4 is a horizontal sectional view taken on the line 4—4 of Figure 3, Figure 5 is a similar view taken on the line 5—5 of Figure 3, Figure 6 is a perspective view of a portion of the structure arranged to operate one of the headlights.

Referring to the drawings wherein for the purpose of illustration is shown the preferred embodiment of our invention, the numeral 10 generally designates the forward portion of an automobile equipped with the conventional type of front axle 11 pivotally supporting spindles 12. The spindles 12 are usually formed with rearwardly extending arms 13 connected for simultaneous movement by a spindle connecting rod 14. The rod 14 is operated through the medium of an operating rod 15, connected to the rod 14 adjacent one end and with a steering crank 16. This construction is of conventional character and is merely illustrated to indicate the application of our improved dirigible apparatus in connection therewith, and it is of course contemplated to modify the present invention for application to modified types of steering mechanism.

With particular reference to the structure of the apparatus embodied in our present invention, the numeral 17 designates a pair of bearing sleeves supported in vertical offset positions on the forward end of the vehicle by means of brackets 18. The brackets 18 embody a pair of outwardly converging bars 19 formed with angular flanges 20 at their inner ends apertured for connection with the side frame beams of the vehicle by means of bolts 21. The outer connected ends of the bars 19 are arranged to form circular gripping collars 22 normally assuming a relatively enlarged formation and contractible by means of a bolt 23 extending through apertures in the bars 19 adjacent the collars. The collars 22 are securely positioned about the lower ends of the bearing sleeves 17. The upper ends of the sleeves 17 are formed with forwardly extending bracket arms 24, the forward portions being bent at a slight upward inclination as clearly shown in Figure 3. Secured to or formed integral with the forward ends of the bracket arms 24 and extending at an upward rearwardly inclined position are auxiliary relatively short bearing sleeves 25, the upper and lower ends being formed with tapered bores for the reception of tapered bearings.

Rotatably fitted into each main bearing sleeve 17 is a shaft 26, the upper and lower ends thereof projecting beyond the ends of the main bearing sleeves. The upper ends of the shafts 26 connect with sleeves 27 formed on the outer ends of horizontal inwardly extending arms 28 having their inner ends bent downwardly at right angles to form bearing lugs.

Rotatably mounted in the auxiliary sleeves 25 and arranged to support the vehicle headlights are a pair of relatively short headlight shafts 29, the upper ends being enlarged and formed with angular headlight supporting brackets 30 terminating in angular apertured ears 31. The ordinary type of headlights indicated at 32 are bolted or otherwise secured to the ears 31 so as to be movable with the brackets 30. Rigidly secured upon the lower projecting ends of the shafts 29 are sleeves 33 formed on the outer ends of bracket arms 34 extending inwardly parallel with the arms 38 carried by the main shafts 26. The inner ends of the bracket arms 34 are provided with up-turned bearing lugs arranged parallel with the lugs formed on the arms 28.

The bearing lugs formed on the inner ends of the bracket arms 28 and 34 are pivotally connected with bearing members 35 each embodying vertical bearing sleeves engageable with the lugs and right angular horizontal sleeves engageable with the ends of connecting brackets 36. The brackets 36 embody longitudinally extending bars formed at their ends with right angular parallel bearing extensions 37 rigidly attached to the horizontal sleeves of the bracket members 35. This construction provides a structure pivotally connecting the main and auxiliary shafts 26 and 29 so that these shafts will be simultaneously rotated.

Secured to the lower projecting ends of the main shaft 26 and extending rearwardly are horizontal levers 38 formed with bearing ears 39 on their forward ends rigidly connected with the lower end of the main shaft and provided with vertical sleeves 40 at their rear ends. The sleeves 40 are pivotally connected with the ends of a transverse connecting bar 41 having its intermediate portion offset downwardly as indicated at 42 and provided with vertical upwardly extending shafts 43 at the ends. The shafts 43 extend through the sleeves 40 of the levers and are secured in position by nuts 44 threadedly mounted on the upper ends. Formed integral with the transverse connecting rods 41 and extending horizontally in a rearwardly direction therefrom is a projecting lug 45. A connecting bracket 46 is secured upon the lug 45 embodying a sleeve positioned over the lug and secured thereon and also including an apertured inwardly extending ear 47. Pivotally connected with the ear 47 and extending rearwardly for connection with the operating rod 15 of the vehicle steering mechanism is a connecting bar 48 having a bracket 49 pivotally connected with its inner end. The bracket 49 is formed for detachable connection with the vehicle operating rod forming a pivoted connection of the dirigible apparatus with the steering mechanism of the automobile. It will be particularly noted, that the bracket arms 34 connected with the forward auxiliary shaft 29 are considerably shorter than the arms 28 secured to the upper end of the main shaft so that a greater circumferential movement will be imparted to the auxiliary headlight carrying shaft 29 than is imparted to the main shafts.

From the foregoing description and the drawings, it will be readily apparent that the present invention embodies mechanism arranged in connection with the usual steering apparatus of a vehicle so as to rotate the headlights simultaneously with the steering movement of the wheels. The structure is designed however, to rotate the headlights in an increased arcuate movement so as to operate the headlights in advance of the steering movement of the wheels. The headlight bracket structure is also formed so that the headlights will be tilted downwardly to cast the light rays at a downwardly inclined angle, the inclination increasing directly with the angular rotation of the lights. This construction will be found exceedingly serviceable when operating a vehicle on roadways which described an undulatory course thus greatly eliminating the danger of leaving the roadway when traveling on unfamiliar curves. Furthermore, the present structure is constructed to be reliable in operation so as to further reduce the danger of accidents while driving at night.

It is to be understood that the form of our invention herewith shown and described is to be taken as the preferred embodiment of the same and that various changes as to the shape, size and arrangement of parts may be resorted to without departing from the spirit of the invention or the scope of the subjoined claims.

Having thus described our invention, we claim:

1. In a dirigible headlight, a bearing sleeve arranged in vertical position upon a vehicle body, an arm member projecting from the upper end of said sleeve, a second bearing sleeve carried upon the free end of said arm and raised to an angle with respect to the longitudinal axis of the first mentioned sleeve, a shaft rotatably arranged in each of said sleeves, an arm carried by each shaft, a coupling link between said last named arms, means for operatively connecting said vertical shaft with the vehicle steering mechanism to cause the shaft to move simultaneously with the mechanism, and means for supporting a headlight upon the inclined shaft.

2. In a dirigible headlight, a bearing sleeve arranged in vertical position upon a vehicle body, an arm member projecting from the upper end of said sleeve, a second bearing sleeve carried upon the free end of said arm and raised to an angle with respect to the longitudinal axis of the first mentioned sleeve, a shaft rotatably arranged in each of said sleeves, an arm carried by each shaft, a coupling link between said last named arms, means for operatively connecting said vertical shaft with the vehicle steering mechanism to cause the shaft to move simultaneously with the mechanism, means for supporting a headlight upon the inclined shaft, that arm connected with said inclined shaft being of materially less length than the arm carried by the vertical shaft to accelerate the movement of the inclined shaft relative to the vertical shaft.

3. A vehicle headlight comprising a pair of rotatable shafts one of said shafts being raised in vertical position, the other of said shafts being tilted slightly from the vertical, a link connecting the shafts for causing simultaneous oscillation of the same, and means for connecting said vertical shaft with the vehicle steering apparatus for actuation simultaneously therewith, said tilted shaft having the upper end angled to normally extend in a horizontal plane to support a vehicle headlight in position to cast a horizontal beam of light when a vehicle is travelling in a straight path and to swing the light to direct the beam downwardly and laterally when the shafts are oscillated during the turning movement of the vehicle.

In testimony whereof we affix our signatures.

EDMUND BARBER.
NATHAN INGRAHAM.